United States Patent

Taylor et al.

Patent Number: 5,488,796
Date of Patent: Feb. 6, 1996

[54] FISHING LINE SENSOR

[76] Inventors: Jared M. Taylor, 8813 Darnel Rd., Eden Prairie, Minn. 55344; Patrick E. Taylor, 2925 Thomas Ave., Rice Lake, Wis. 54868

[21] Appl. No.: 178,492

[22] Filed: Jan. 7, 1994

[51] Int. Cl.⁶ ............................................. A01K 97/12
[52] U.S. Cl. ................................................. 43/17
[58] Field of Search ...................................... 43/17

[56] References Cited

U.S. PATENT DOCUMENTS

| | | | |
|---|---|---|---|
| 2,170,000 | 8/1939 | Eggleston | 43/17 |
| 2,741,054 | 4/1956 | Brundage | 43/17 |
| 2,785,493 | 3/1957 | Thiel | 43/17 |
| 2,876,579 | 3/1959 | Plouffe | 43/17 |
| 3,078,610 | 2/1963 | Howell | 43/17 |
| 3,359,673 | 12/1967 | Roemer | 43/17 |
| 3,641,693 | 2/1972 | Pinnow | 43/17 |
| 4,246,716 | 1/1981 | Elmer | 43/17 |
| 4,399,631 | 8/1983 | Smith | 43/17 |
| 4,479,321 | 10/1984 | Welstead | 43/17 |
| 4,727,673 | 3/1988 | Dumar | 43/17 |
| 4,928,419 | 5/1990 | Forrestal | 43/17 |
| 4,934,090 | 6/1990 | Storey | 43/17 |
| 4,942,687 | 7/1990 | Post | 43/17 |
| 4,996,788 | 3/1991 | Wieting | 43/17 |
| 5,067,269 | 11/1991 | Eppley | 43/17 |
| 5,097,618 | 3/1992 | Stoffel | 43/17 |
| 5,339,558 | 8/1994 | Monsen | 43/17 |

*Primary Examiner*—Kurt Rowan
*Attorney, Agent, or Firm*—Nawrocki, Rooney & Sivertson

[57] ABSTRACT

A fishing line sensor including a base, a shaft rotatably mounted to the base and a reel mounted to the shaft. The reel is rotatable relative to the base with the shaft. The reel is configured for winding and unwinding fishing line. A signalling device is mounted on the shaft and rotatable with the shaft and reel. The device includes a mercury switch switchable in response to rotation of the reel. An electronic signal producing element is activated in response to a switching of the mercury switch.

6 Claims, 2 Drawing Sheets

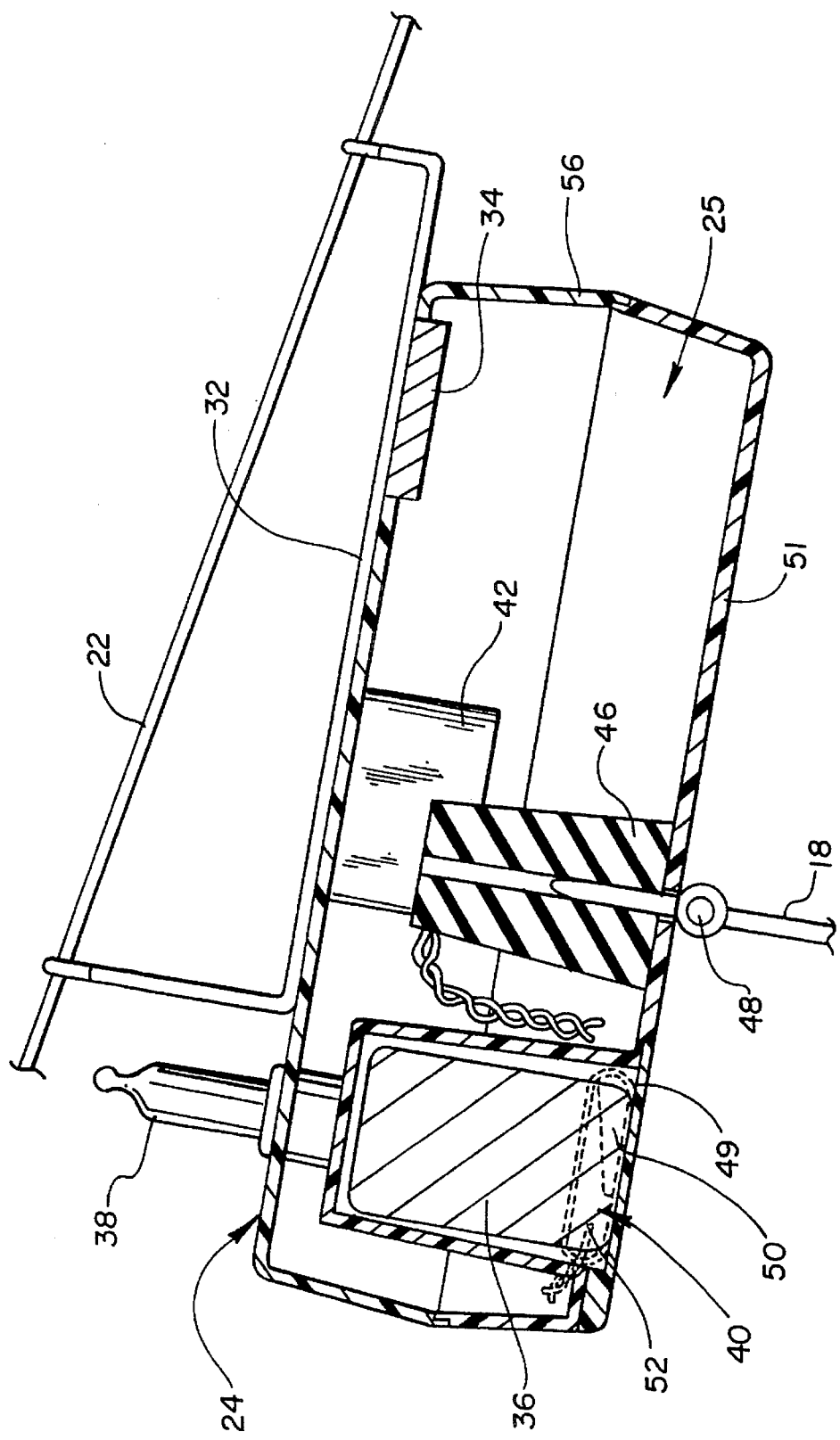

FISHING LINE SENSOR

TECHNICAL FIELD

The present invention pertains to ice fishing line sensors, and in particular to signalling devices using an electronic signal.

BACKGROUND OF THE INVENTION

Ice fishing is a common and popular sport in the colder regions of the United States and Canada and other parts of the world. Ice fishing entails venturing onto an ice covered water body, drilling one or more holes through the ice covering the water body, and lowering a hooked and baited fishing line through the hole and into the water.

In ice fishing's most basic form, the fisherman sits adjacent the hole with the line attached to a fishing rod. Often, however, the fisherman may drill several holes and place a fishing line, having an accompanying sensor device, in each hole. These devices are commonly referred to as tip-ups. This name refers to the movement of a flag on the device from a lowered first position to a raised second position as a result of a fish pulling on a fishing line attached to the tip-up. When the fisherman sees the flag in the raised second position, the line can be braked after the hook is set, and the fish is then reeled in.

An ice fisherman may also drag onto the ice, using a sled, a small hut or house. The house has an opening in the floor through which a hole may be drilled in the ice. The hut may include benches or chairs and a heater. The fisherman can fish within the hut for extended periods of time, while simultaneously having several fishing line sensors or tip-ups in place nearby. From time to time, the fisherman may leave the house to inspect the tip-ups and reel in any fish which may have tripped the flag.

In view of the short periods of daylight during winter in the colder regions, ice fishing often occurs at night. Consequently, prior tip-ups have included a light mounted to the flag. When the flag is in the first position, the light is off, and when the flag is in the second position, the light is on.

SUMMARY OF THE INVENTION

Applicants have devised a fishing line sensor which is not only visible at night, but may also be capable of producing an audible signal. The audible signal can signal a fisherman that a fish is on the line even when the fishing line sensor is not visible, for example, when the fisherman is in the house. Applicants' sensor is particularly useful at night, although it also may be useable during the day. Each signal may be produced intermittently in response to the rate at which a fish runs with the line.

One embodiment of Applicants invention may include a base, a shaft rotatably mounted to the base, and a reel mounted to the shaft. The reel may be rotatable relative to the base and the shaft and configured for winding and unwinding fishing line.

A signalling device can be mounted on the shaft rotatable with the shaft and the reel. The signalling device may include a mercury switch switchable in response to the rotation of the reel. An electric signal producing element may be activated in response to the switching of the mercury switch. The electronic signal producing element may include a light producing a visible signal. The signal producing element may include a device for producing an audible signal, such as a buzzer. The fishing line sensor may include a switch to selectively disconnect the device for producing an audible signal from a power source.

The fishing line sensor may also include a housing having a removable cover. The housing may be configured to substantially enclose the signalling device.

The fishing line sensor may also include a flag mounted to the base having a first lowered positioned and a second raised position. A device may be provided for releasably retaining the flag in the first position responsive to the rotation of the reel. The fishing line sensor may also include a device for biasing the flag from the first position to the second position such that when the flag is placed in the first position and the reel rotated, the flag will be released and biased into the second position.

BRIEF DESCRIPTION OF THE DRAWINGS

FIG. 3 is a cross-section of a housing of the fishing line sensor of FIG. 1.

DETAILED DESCRIPTION OF THE INVENTION

Figure 1:
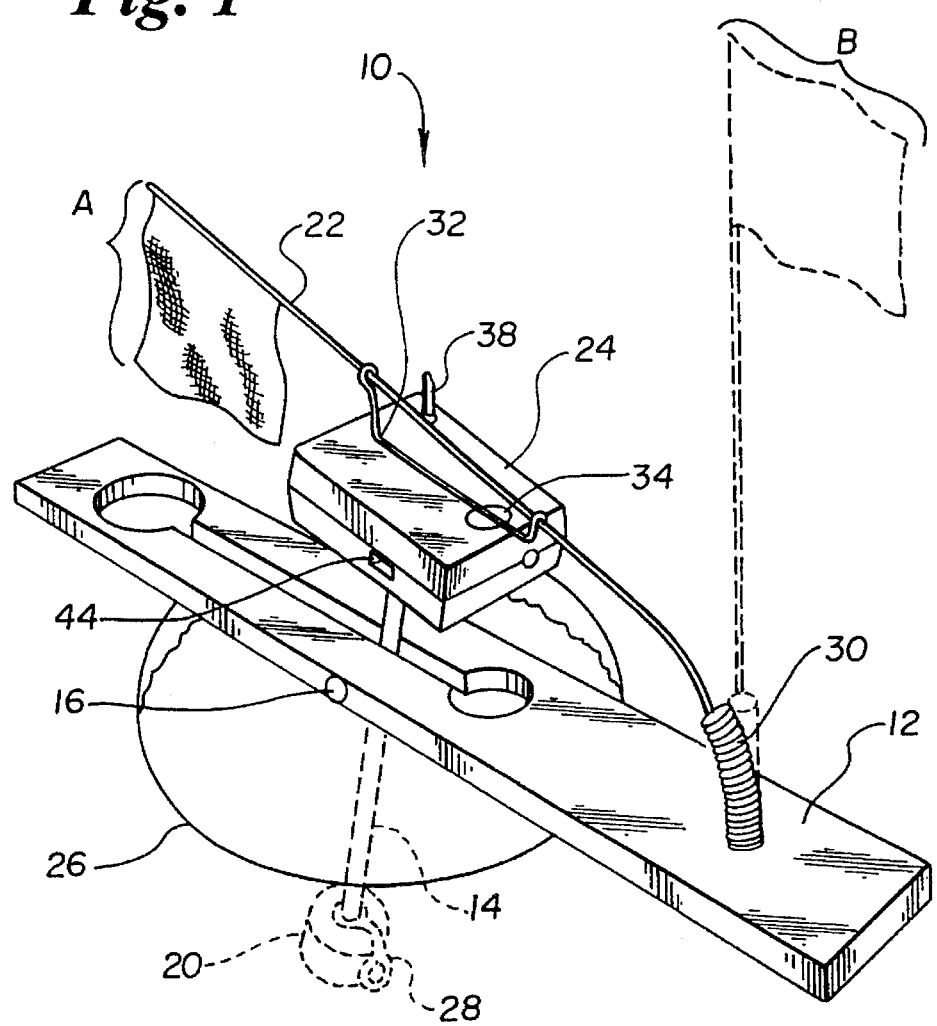
FIG. 1 is a perspective view of the fishing line sensor, in accordance with the present invention, positioned over a hole through the ice.

Referring now to the drawings wherein like reference numerals indicate like elements throughout the several views, FIG. 1 shows, in perspective, a fishing line sensor 10 in accordance with the present invention. Fishing line sensor 10 may include conventional components of an ice fishing tip-up, including a base 12 and a tube 14 pivotable with respect to the base 12 about an axle 16. A shaft 18 (a portion of which is shown in FIG. 3) extends through tube 14 and is rotatable within tube 14. A reel 20 is shown connected to one end of shaft 18 and is rotatable with shaft 18, as is a housing 24, as will be discussed hereinafter. Sensor 10 may also include a flag-mounting shaft 22.

In addition to the previously recited well-known tip-up elements, the sensor includes a housing 24, for enclosing a signalling device, rigidly connectable to shaft 18 opposite reel 20. The fishing line sensor 10 may include means, visible at night, and means for producing an audible signal in response to a fish strike. The audible signal can signal a fisherman that a fish is on the line even when the fishing line sensor is not visible, for example, when the fisherman is in a ice fishing house. Applicants sensor 10 is particularly useful at night, although it also may be used during the day. Each signal may also be produced intermittently in response to the rate at which a fish runs with the line.

Base 12 is preferably long enough to span a hole through ice frozen over a water body, such as the generally circular hole 26 shown in FIG. 1. Tube 14, having shaft 18 rotatably mounted therein, can preferably pivot about axle 16 to define an acute angle between tube 14 and base 12.

Reel 20 is configured to have fishing line wound around it, as well known in the art. An eyelet 28 may be mounted to tube 14 proximate reel 20 to guide the winding and unwinding of the line.

Flag 22, mounted to base 12, preferably includes a resilient member, such as spring 30. Spring 30 may bias flag-mounting shaft 22 from a first, down position A to a second, up position B. A bail 32 may be slidably and rotatably connected to shaft 22. Bail 32 is preferably made from a ferromagnetic material such as steel. If bail 32 is fabricated from a ferromagnetic material, it can be magnetically coupled to a magnet 34 connected to housing 24 to hold shaft 22 in first position A.

Figure 2:
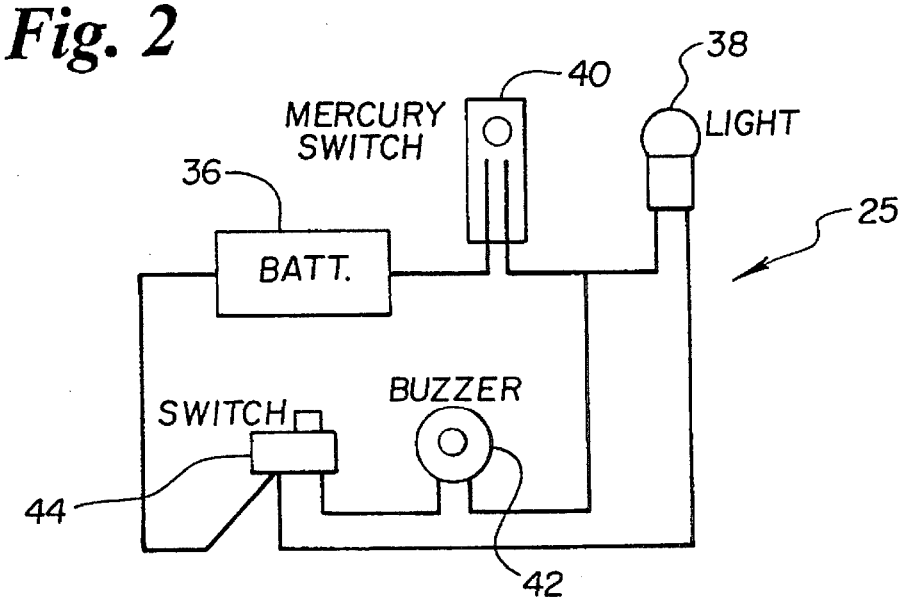
FIG. 2 is a schematic view of the electronics of the fishing line sensor.

FIG. 2 is a schematic illustration of the electronic components of a signalling device 25. Reference numeral 36 designates a power supply or battery. Signalling device 25 may include a visual signal mechanism for night fishing such as a light 38. Light 38 may be connected in series with, and be responsive to, a switch 40. Switch 40 may be a mercury switch.

Signalling device 25 also may include an audible signal mechanism 42, such as a buzzer. Buzzer 42 may be connected in series or in parallel with light 38. If buzzer 42 is connected in parallel with light 38, a switch 44 may be provided to selectively connect or disconnect buzzer 42 from power source 36.

FIG. 3 is a vertical cross-section of housing 24 taken in FIG. 1 generally parallel to shaft 22. Housing 24 may be friction-fit mated to shaft 18 by means of a sleeve 46. Sleeve 46 may be made from an elastomeric synthetic.

Shaft 18 may include a conventional hitching element 48. Element 48 can be engaged with bail 32 if housing 24 is removed from shaft 18.

Housing 24 may include a base portion 51 and a removable cover 53. There may be substantial free space within housing 24 for storage of light 38, fishing tackle, or other miscellaneous items (not shown).

Signalling device 25, including battery 36, switch 40, buzzer 42 and switch 44, may be substantially enclosed by housing 24. As shown in FIG. 3, switch 40 may be a mercury switch which includes an elongated vessel 49 enclosing a small amount of mercury 50. Mercury 50 is shown pooled in the lower part of vessel 49, as defined in view of the acute angle between tube 14 and base 12, as discussed above. The switch also generally includes contacts 52 which may be connected by pooling mercury 50 around them.

In operation, sensor 10 is set up over a hole drilled in the ice covering a body of water. Base 12 spans the hole. Tube 14 is preferably adjusted at an acute angle to base 12, with reel 20 positioned below base 12 and signalling device 25 positioned over the base. To set shaft 22 in its first lowered position A, tube 14 is preferably set at an acute angle with housing 24 offset toward spring 30 and vessel 49 disposed upwardly relative to rotation of shaft 18. Bail 32 is then brought into contact with magnet 34, carried by housing 24, to retain shaft 22 in the first position A. Tube 14 being set at an acute angle also maximizes contact between bail 32 and magnet 34. The acute angle between base 12 and tube 14 may, however, be adjusted to reduce the contact surface between bail 32 and magnet 34, and consequently reduce the strength of the coupling between magnet 34 and bail 32.

With tube 14 disposed at an acute angle to base 12, housing 24 can be rotated into a position so that mercury 50 pools in an end of vessel 49 opposite contacts 52. In this position, neither light 38 nor buzzer 42 are activated. It will be understood that, in order to accomplish the desired positioning, it is envisioned that vessel 49 would typically be disposed on the opposite side of shaft 18 from magnet 34.

It is anticipated that shaft 22, light 38, and buzzer 42 of sensor 10 may be used either individually or in combination. Assuming, for purposes of illustration, that the three components are used in combination and positioned as described in the preceding paragraph, they each will be activated when a fish begins to take out line from reel 20. As line is pulled out from reel 20, shaft 18 will rotate within tube 14, consequently rotating housing 24. As housing 24 rotates, magnet 34 will move away from bail 32 breaking the magnetic coupling between magnet 34 and bail 32. The flag mounted to shaft 22 will then move from first position A to second, raised position B.

As housing 24 continues to rotate, mercury 50 in vessel 49 will move alternately toward and then away from contacts 52 of switch 40 because of the cant of shaft 18. Each time mercury 50 reaches contacts 52, light 38 and/or buzzer 42 will emit a signal. As the fish runs more quickly with the line, light 38 and/or buzzer 42 will be rapidly switched off and on. Eventually light 38 and/or buzzer 42 will be on substantially continuously if the fish runs fast enough. Alternately, if a fish is moving away slowly, light 38 and buzzer 42 will go off and on proportionately more slowly.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. An improved apparatus for signalling the presence of a fish on a line extending into a body of water, the apparatus including a base, a mechanism for maintaining said base in a defined position relative to a surface of the body of water, a shaft carried by said base and disposed for rotation, relative to said base, about an axis of elongation of said shaft, and a reel mounted rigidly to said shaft, coaxial therewith, for rotation therewith, the line being wound onto said reel, the improvement comprising:

a. a housing mounted rigidly to said shaft for rotation therewith;

b. an alarm, wherein the alarm is substantially enclosed in said housing; and c. means, received within said housing, for actuating said alarm in response to rotation of said housing.

2. The improvement in accordance with claim 1, wherein the alarm includes a light.

3. The improvement in accordance with claim 1, wherein the alarm includes a device to produce an audible signal.

4. The improvement in accordance with claim 3, wherein the device to produce an audible signal is a buzzer.

5. The improvement in accordance with claim 1, wherein said housing includes a removable cover.

6. Apparatus for signalling the presence of a fish on a line extending into a body of water, comprising:

a base;

means for maintaining said base in a defined position relative to a surface of the body of water;

a shaft carried by said base and disposed for rotation, relative to said base, about an axis of elongation of said shaft;

a reel mounted rigidly to said shaft, coaxial therewith, for rotation therewith, the line being wound onto said reel;

a housing mounted rigidly to said shaft for rotation therewith;

an alarm, wherein the alarm is substantially enclosed in said housing; and means, received within said housing, for actuating said alarm in response to rotation of said housing.

\* \* \* \* \*